United States Patent
Jun et al.

(10) Patent No.: US 6,810,084 B1
(45) Date of Patent: Oct. 26, 2004

(54) MPEG DATA FRAME AND TRANSMIT AND RECEIVE SYSTEM USING SAME

(75) Inventors: Hee-Young Jun, Seoul (KR); Dae-Jin Kim, Kwangju (KR)

(73) Assignee: Munhwa Broadcasting Corporation, Youngdeungpo-ku (KR)

( * ) Notice: Subject to any disclaimer, the term of this patent is extended or adjusted under 35 U.S.C. 154(b) by 716 days.

(21) Appl. No.: 09/723,993

(22) Filed: Nov. 28, 2000

(30) Foreign Application Priority Data

Jun. 12, 2000 (KR) ........................................ 2000-32226

(51) Int. Cl.⁷ .......................... H04N 7/12; H04N 9/455; H03K 5/159
(52) U.S. Cl. ................... 375/240.28; 375/232; 348/521
(58) Field of Search ....................... 375/240.28, 240.01, 375/240.25, 321, 232; 348/521, 469, 495, 470, 608, 614, 537

(56) References Cited

U.S. PATENT DOCUMENTS

| | | | | |
|---|---|---|---|---|
| 5,508,752 A | * | 4/1996 | Kim et al. .................. | 348/608 |
| 5,572,547 A | * | 11/1996 | Citta et al. .................. | 375/232 |
| 5,619,269 A | * | 4/1997 | Lee et al. .............. | 375/240.01 |
| 5,684,827 A | * | 11/1997 | Nielsen ...................... | 375/232 |
| 5,831,690 A | * | 11/1998 | Lyons et al. ........... | 375/240.28 |
| 6,356,598 B1 | * | 3/2002 | Wang ......................... | 375/321 |
| 6,504,578 B1 | * | 1/2003 | Gu ............................. | 348/521 |
| 6,583,822 B1 | * | 6/2003 | Jun ............................. | 348/537 |

* cited by examiner

Primary Examiner—Gims Philippe
(74) Attorney, Agent, or Firm—Fish & Richardson P.C.

(57) ABSTRACT

Disclosed is an MPEG data frame and a transmitting and receiving system using the MPEG data frame for enhancing receiving performance of receiver which moves or is stationary. The digital TV broadcasting data frame according to the preferred embodiment of the present invention comprises a data frame which includes at least one data field which has 313 data segments. The first data segment of the data field is a data field sync signal which includes a training data sequence used for synchronization at the receiver, and the other 312 data segments each include a 188-byte transport packet and 20-byte error correction data. Therefore, when null packets are input to the 8 VSB transmitter, 2-level training sync signals are used as training data for an equalizer at the receiver so as to increase receiving performance of a receiver that moves or is stationary.

26 Claims, 11 Drawing Sheets

US 6,810,084 B1

MPEG DATA FRAME AND TRANSMIT AND RECEIVE SYSTEM USING SAME

BACKGROUND OF THE INVENTION (a) Field of the Invention

The present invention relates to a moving picture experts group (MPEG) data frame and a transmit and receive (Tx/Rx) system using the MPEG data frame. More specifically, the present invention relates to a digital TV broadcasting data frame for enhancing the receiving performance of a moving or fixed receiver, a digital TV Tx/Rx apparatus, and an MPEG data Tx/Rx system.

(b) Description of the Related Art

In general, digital TV provides higher resolution and has a wider screen than analog TV, and it provides multi-channel CD level audio sound. A change brought about by digital TV is the trend of regarding such devices not as home appliances but as a collection of services that will enhance levels of various services and their related techniques. The digital TV will generate other added values as much as the tremendous spreading of personal computers (PC) and the Internet, and will also likely influence overall industries such as information technology (IT), industrial techniques, and home appliances markets.

The U.S., Europe, and Japan each provide broadcasting methods, specifications and drive standardization for digital TV. In the case of the U.S., the transmission format adopted is the vestigial side band (VSB) method proposed by the U.S. company Zenith, the video compression format adopted is MPEG, the audio compression format adopted is Dolby AC-3, and the display format is provided to be compatible with existing display methods. Here, when an amplitude modulation on signals is performed, two side bands are generated, one on and one below a carrier wave. One side band signal is then greatly attenuated, and the other is modulated. This method is called VSB modulation. That is, since the double side band that uses upper and lower side bands has lower band efficiency, the single side band (SSB) that uses one side band is introduced, and this SSB is developed to VSB through filter implementation.

The Grand Alliance (GA) for unification of digital TV standards adopted 8 VSB as a broadcasting transmission method using terrestrial waves, and after that, the Advisory Committee on Advanced Television Service (ACATS) of the FCC also adopted 8 VSB as the transmission method for broadcasting terrestrial waves. Here, 8 VSB represents a signal allocation and transmission method wherein there are four data levels (+1, +3, +5, and +7) in the positive number side and another four data levels (−1, −3, −5, and −7) in the negative number side with reference to '0', thereby supplying eight transmitting signal levels. Therefore, when the terrestrial wave broadcasting station modulates digital data into 8 VSB format data and transmits the data to the air via an antenna, the digital TV at each house receives and demodulates the data in order for viewers to watch TV.

The above-noted terrestrial digital TV broadcasting system transmits a training signal every 24.2 ms in order for the receiver to adjust degradations generated by the transmission channels. However, since variations in multi-path characteristics and Doppler interferences exist within the 24.2 ms period, the receiver cannot accurately equalize the data. For this reason, some experts point out the weaknesses that it is more difficult to receive digital TV broadcasting programs by using an indoor antenna than to receive analog TV broadcasting programs, and it is impossible to receive digital broadcasting programs with a moving receiver in America.

The MPEG transport encoder that compresses the signals inserts 5 to 10% null packets into the total transmission data so as to adjust a target bit rate.

FIG. 1 shows a block diagram of a general VSB digital terrestrial broadcasting transmitter.

Referring to FIG. 1, a data randomizer 11 randomizes the data then outputs the randomized data to a Reed-Solomon (RS) encoder 12, the RS encoder 12 performs RS encoding on the random input data to add 20-byte parity codes and then outputs the data to a data interleaver 13. The data interleaver 13 interleaves the data according to a predetermined rule and outputs the interleaved data to an 8 VSB encoder (a trellis encoder 14 in this case). The trellis encoder 14 converts the interleaved data from byte-unit data into symbol-unit data, performs trellis encoding on the converted data and outputs the data to a multiplexer 15. The multiplexer 15 multiplexes trellis-encoded symbol sequences, segment sync signals provided from the outside, and field sync signals. The pilot inserter 16 inserts pilot signals into the multiplexed symbol sequences. The symbol sequences with the inserted pilot signals pass through a pre-equalizer filter 17 (this can be omitted) and then are provided to a VSB modulator 18. The VSB modulator 18 modulates the symbol sequences into VSB signals and outputs the VSB signals to a radio frequency (RF) upconverter 19. The RF upconverter 19 converts the modulated 8 VSB signals of a base band into RF band signals and transmits the converted data to the air via the antenna.

As shown in FIG. 1, the MPEG transport system inputs data to the digital terrestrial broadcasting transmitter. The data have a format in which a packet is configured as an MPEG2 transport stream (TS) of 188 bytes. The input data have a speed of 19.39 Mbps and a serial data format.

The input data are converted into a random format by the data randomizer, and RS encoding for adding 20-byte RS parity to a predetermined unit packet is performed, and then forward error correction (FEC) for 1/6 data field interleaving and trellis encoding at a 2/3 ratio is performed on the input data. The randomization and FEC processes are not performed on sync bytes of the transport packets. After the randomization and FEC processes, the data packets are converted into transmission data frames, and then data sync signals provided from the outside and the field sync signals are added.

FIG. 2 shows a configuration of a conventional transmission frame, and FIG. 3 shows a configuration of one field sync.

Referring to FIGS. 2 and 3, each data frame includes two data fields, and each field includes 313 data segments. The first data segment in the data field represents a data field sync signal, hereinafter referred to as a sync signal. This signal includes a training data sequence to be used by the receiver in the synchronization process.

The other 312 data segments respectively have a 188-byte transport packet and additional 20-byte data for the FEC. In actuality, the data in each data segment are generated from some transmission packets because of the data interleaving. The data segments include 832 symbols. The first four symbols are transmitted in a binary format and provide segment synchronization.

The data segment sync signal represents a sync byte that is the first of 188 bytes of the MPEG2 TS. The other 828 symbols represent 187 bytes of the transport packet and 20 bytes of the FEC. Since the 828 symbols are transmitted as 8-level signals, each symbol carries 3 bits. Therefore, 2484-bit (828×3) data are transmitted in each data segment.

FIG. 4 shows a block diagram of a general receiver of a system for transmitting VSB terrestrial broadcasting.

Referring to FIG. 4, a tuner 21 selects a channel, an intermediate frequency (IF) filter 22 performs intermediate band filtering, and a sync frequency detector 22-detects desired frequencies. A sync and timing detector 22' detects the sync signals and clock signals. When these signals are passed through an NTSC interference-rejection filter 23, an equalizer 24 removes interference caused by multi-path signals. A phase tracker 25 compensates for phase errors. The following channel decoder part is arranged in the reverse order to that of the transmitter.

As shown in FIGS. 1 to 4, since the first segment of the 313 segments of the general digital TV broadcasting data frames is configured as 2-level training sequences (field syncs) for equalizer convergence, when equalizing the channel equalizer of the receiver by only using the field sync of the first segment in the 8 VSB system, receiving the signals while moving is impossible.

To attempt to solve this problem, a blind equalization method to equalize the equalizer of the information data of the 312 segments excepting the 2-level training sequences is used, but in this blind equalization method, receiving performance is not fully improved when the receiver is moving since this method uses 8-level general information data.

SUMMARY OF THE INVENTION

It is an object of the present invention to provide digital TV broadcasting data frames wherein null packets are substituted with training data to use in the equalization process at the receiver and to improve receiving performance of multi-path signals in a fixed or moving condition when receiving digital TV broadcasting programs.

It is another object of the present invention to provide a digital TV transmitter for outputting digital TV broadcasting data frames.

It is still another object of the present invention to provide a digital TV receiver for receiving the digital TV broadcasting data frames.

It is still another object of the present invention to provide an MPEG data transmit/receive system for compensating for degradations generated in the transmission channel when transmitting and receiving the MPEG data.

In one aspect of the present invention, in a digital television broadcasting transmitting and receiving method using a data frame including at least one data field having 313 data segments, the first data segment of the data field being a data field sync signal including a training data sequence used in equalization by a receiver, and the remaining 312 data segments each including a 188-byte transport packet and 20-byte error correction data, a digital television broadcasting transmitting and receiving method using moving picture to experts group (MPEG) data frames comprises segments, corresponding to null packets from the 312 data segments, including a training sync signal that is a predetermined data pattern with a predetermined level, the training sync signal being used as training data for an equalizer at a receiver so as to increase receiving performance at a receiver that either moves or is stationary.

In another aspect of the present invention, in a digital television transmitter including a moving picture experts group 2 (MPEG-2) transport encoder that outputs serial data configured in a MPEG-2 transport stream configuration having 188-byte packets, and a data format buffer that temporarily stores the serial data and outputs formatted data, a digital television transmitter comprises a null packet detector for checking whether the formatted data include the null packets, and when the formatted data include the null packets, outputting skip pulses and training sync signals; an encoder for encoding the formatted data and outputting the encoded data, and when the skip pulses are input, freezing the encoding operation; and a multiplexer for receiving segment sync signals and data field sync signals provided from the outside, receiving the training sync signals from the null packet detector, multiplexing the encoded data provided by the encoder, and outputting digital television broadcasting data frames.

The encoder comprises: a data randomizer for randomizing the data provided by the data format buffer and outputting the randomized data, and when the skip pulses are input, freezing the randomizing operation; a Reed-Solomon (RS) encoder for performing RS encoding on the data output from the data randomizer and outputting the RS-encoded data, and when the skip pulses are input, freezing the RS encoding operation; a data interleaver for interleaving the RS-encoded data and outputting the interleaved data, and when the skip pulses are input, freezing the interleaving operation; and a trellis encoder for performing trellis encoding on the interleaved data and outputting the trellis-encoded data to the multiplexer, and when the skip pulses are input, freezing the trellis encoding operation.

The digital television broadcasting data frame comprises: a data frame including at least one data field having 313 data segments, the first data segment of the data field being a data field sync signal including a training data sequence used for equalization by a receiver, and the remaining 312 data segments each including a 188-byte transport packet and 20-byte error correction data; and segments, corresponding to null packets from the 312 data segments, including a training sync signal that is a predetermined data pattern with a predetermined level.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 5:
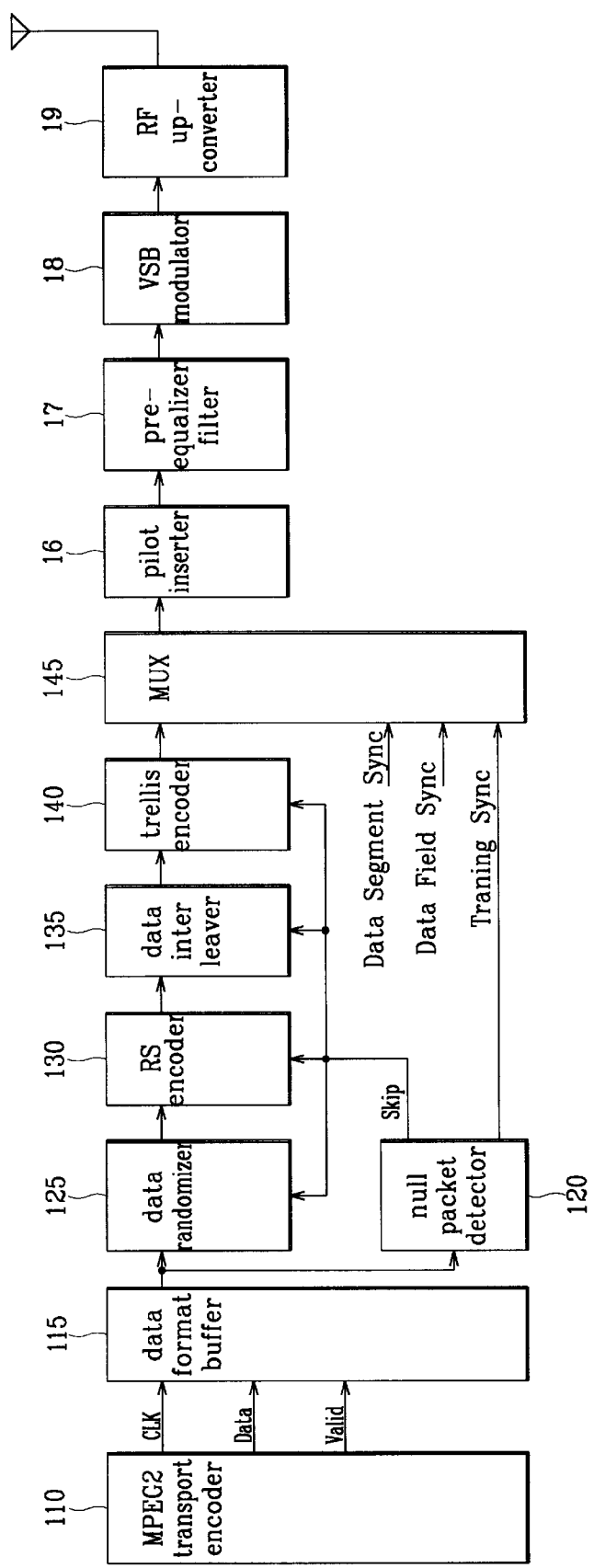
FIG. 5 shows a block diagram of a digital TV transmitter using data frames for digital TV broadcasting according to a preferred embodiment of the present invention.

FIG. 5 shows a block diagram of a digital TV transmitter using data frames for digital TV broadcasting according to a preferred embodiment of the present invention.

Referring to FIG. 5, the digital TV transmitter using data frames for digital TV broadcasting comprises an MPEG-2 transport encoder 110, a data format buffer 115, a null packet detector 120, a data randomizer 125, an RS encoder 130, a data interleaver 135, a trellis encoder 140, a multiplexer 145, a pilot inserter 16, a pre-equalizer filter 17, a VSB modulator 18 and an RF upconverter 19.

The MPEG-2 transport encoder 110 outputs serial data having the MPEG-2 TS structure having 188-byte packets to the data format buffer 115 at a speed of 19.39 Mbps.

The data format buffer 115 stores the serial data output from the MPEG-2 transport encoder 110 for a predetermined period of time and outputs the serial data to the data randomizer 125.

The null packet detector 120, when the data are input to the data format buffer 115, detects the null packet, and when the null packet is detected, the null packet detector 120 outputs the training sync signals to the multiplexer 145, and outputs skip signals to each of the data randomizer 125, RS encoder 130, data interleaver 135 and trellis encoder 140 to freeze their operations.

The data randomizer 125 randomly outputs the data provided by the data format buffer 115 to the RS encoder 130, and the RS encoder 130 performs RS encoding on the data randomly input from the data randomizer 125, adds 20-byte parity codes, and then outputs the data to the data interleaver 135. In detail, the RS encoder 130 uses a code of "t=10 (207, 187)", and inserts 20 RS additional bytes into the 187 bytes. The RS encoder 130 is frozen during the data segment corresponding to the training sync signal.

The data interleaver 135 processes the data according to a predetermined rule, and the trellis encoder 140 converts the interleaved data from byte format into symbol format, performs trellis encoding, and outputs the data to the multiplexer 145.

The multiplexer 145 provides the multiplexed data to the pilot inserter 16. Since the following processes are identical with those previously described, no further description will be provided.

As described above, when the data are provided from the MPEG-2 transport encoder 110 to the data format buffer 115, the null packet detector 120 detects the null packet.

The data stream excepting the null packet pass through the data randomizer 125, the RS encoder 130, the data interleaver 135 and the trellis encoder 140 to be converted into 8-level transmission waves, and the 2-level training sync signal corresponding to the null packet is inserted into the multiplexer 145.

In the case of outputting the digital TV broadcasting data frames by using the above-noted method, since the receiver has much more 2-level training data than the case of conventional outputting of the data frames, the equalizer of the receiver can increase the convergence speed and can improve receiving signal performance problems caused by signal interference generated by the multi-path signals or the Doppler effect.

Figure 6:
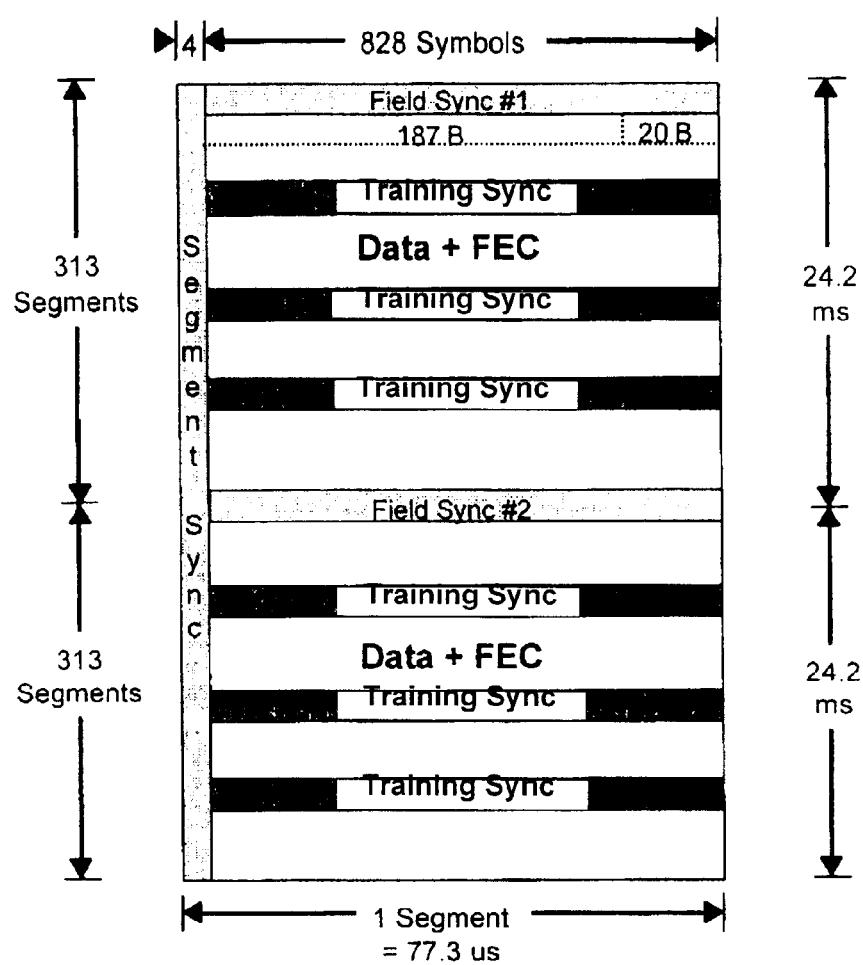
FIG. 6 shows a schematic diagram of the data frames for the digital TV broadcasting according to the preferred embodiment of the present invention.

FIG. 6 shows a schematic diagram of the data frames for digital TV broadcasting according to the preferred embodiment of the present invention.

Figure 1:
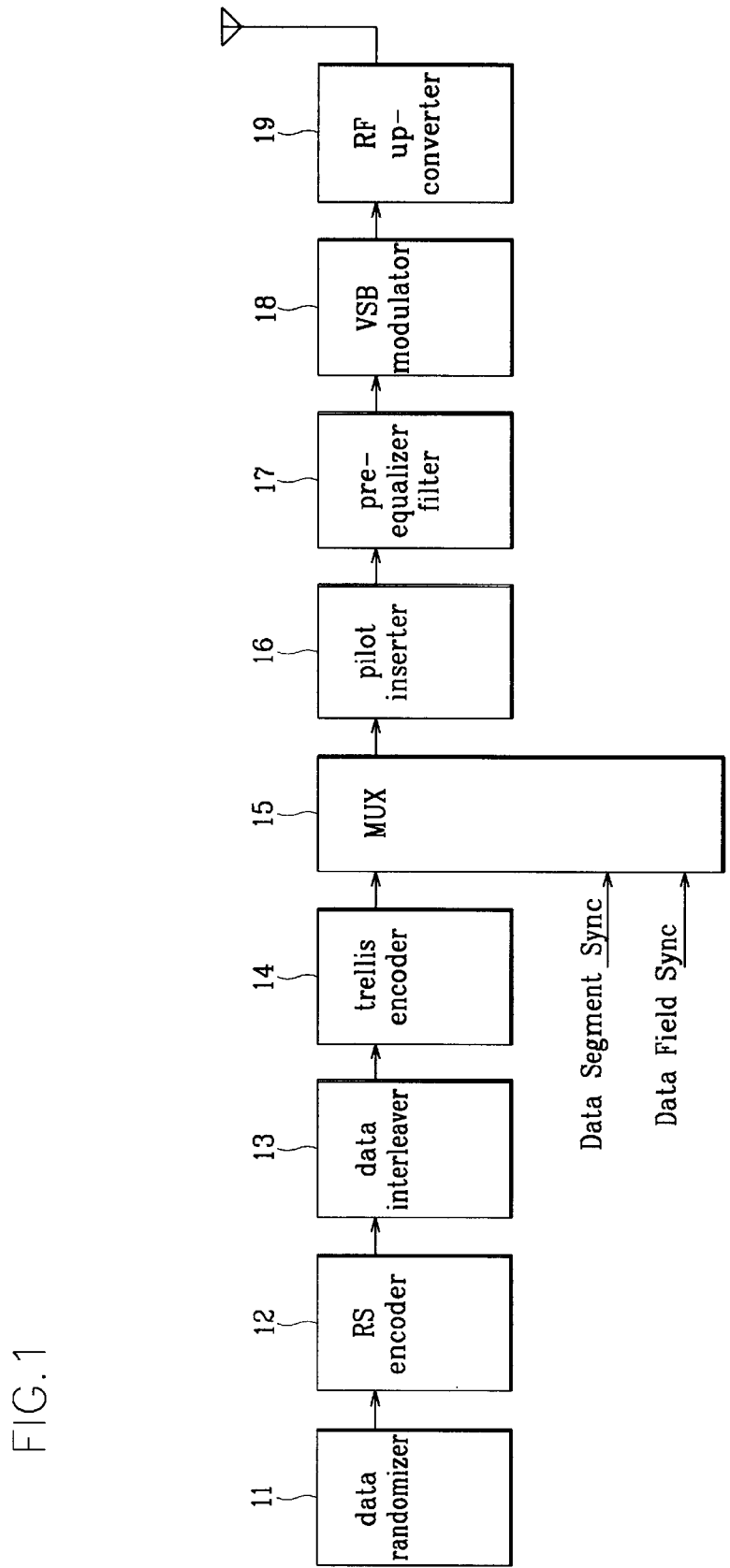
FIG. 1 shows a block diagram of a general VSB digital terrestrial broadcasting transmitter.
Figure 2:
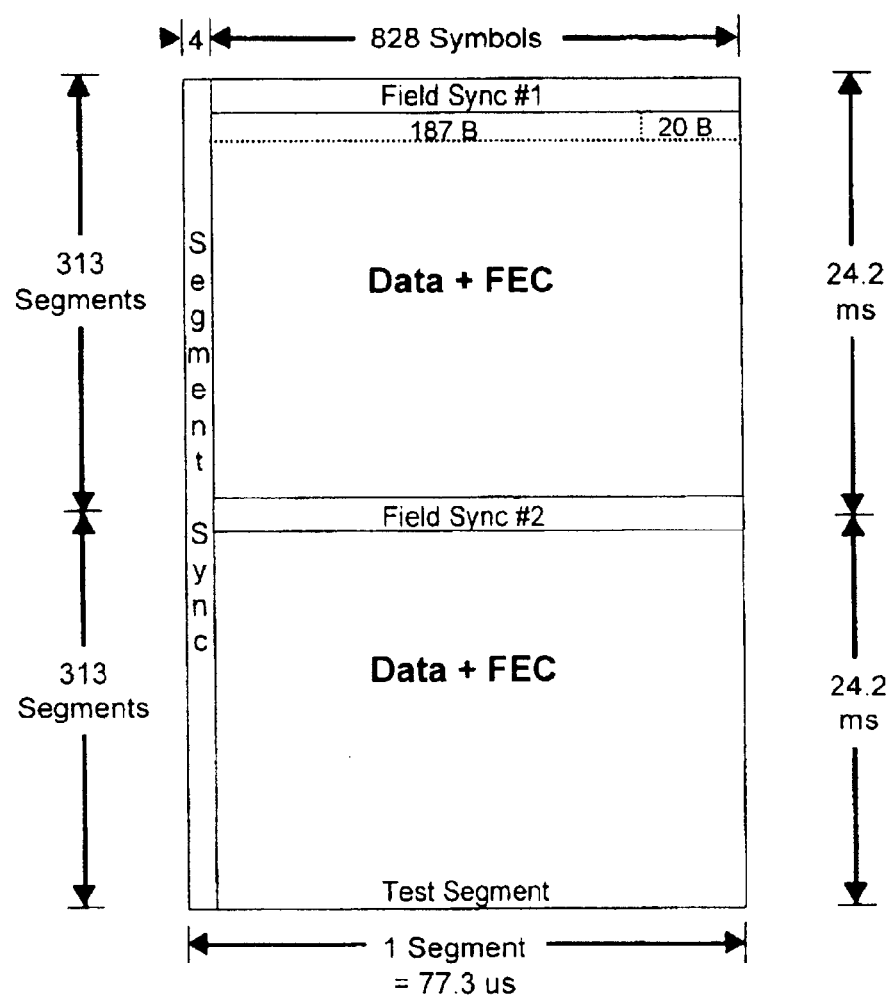
FIG. 2 shows a configuration of a conventional transmission frame.
Figure 3:
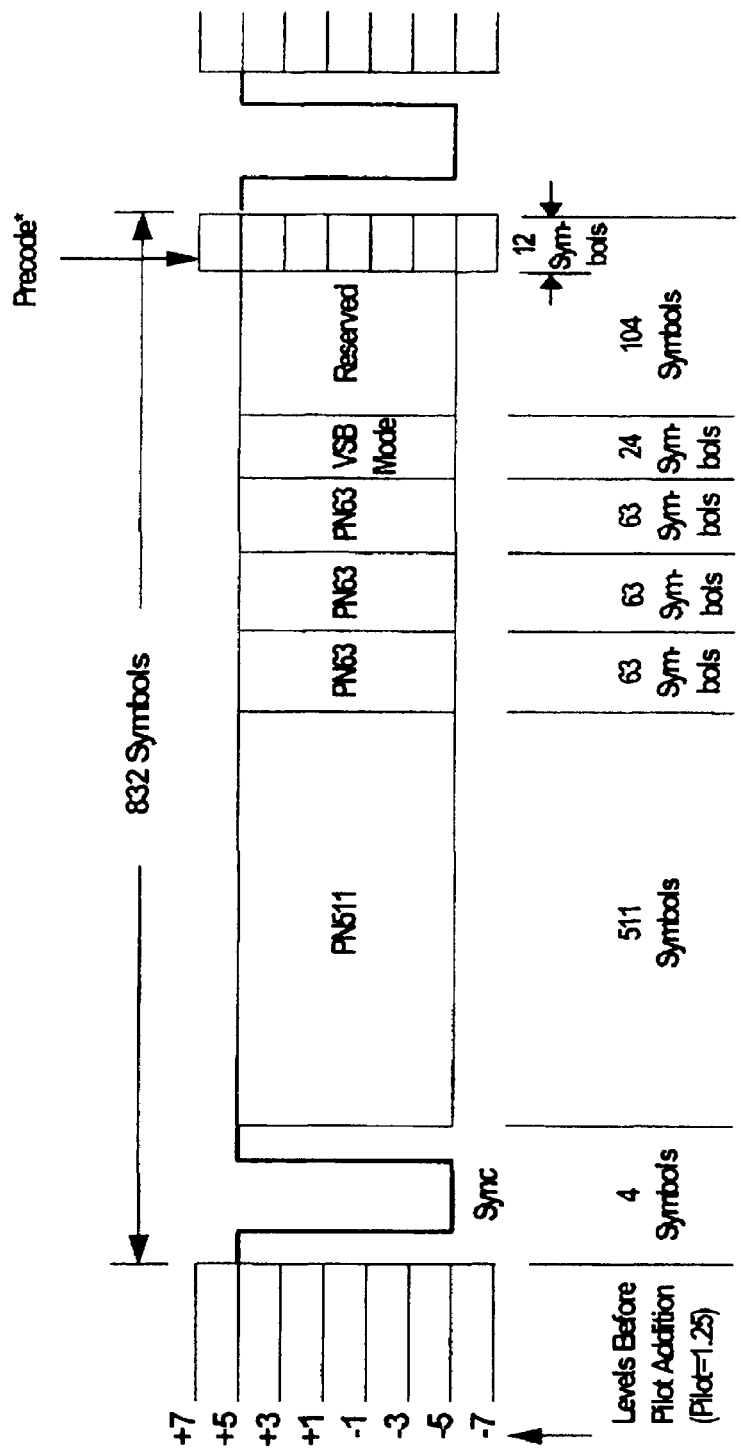
FIG. 3 shows a configuration of a field sync.

Referring to FIG. 6, the training sync signal is allotted in a block in which the data or the FEC as described in FIG. 2 is stored. In the data frames according to the preferred embodiment of the present invention, a training sync signal having 3 segments in a field is assigned.

Various examples for assigning the training sync signals in the block in which data or the FEC is stored will now be described.

One example is a method for transmitting 2-level training sync signals, and another example is a method for equally arranging the training sync signals within the field according to the number of packets from the 312 segments, excepting the field sync. In detail, the frame format buffer counts the number of null packets in a field over a period of time, and arranges the same equally in the data field. The number of null packets per field ranges from the minimum 0 to the maximum 312. (Therefore, the number of training sync signals can be transmitted using 9 bits from 104 preliminary space bits in the field sync.?) When receiving the number of the training sync signals, the receiver can calculate positions for the training sync signals.

If there is one null packet provided, the training sync signal is inserted into the middle part of the 312 segments, and if there are two null packets provided, the training sync signals are inserted into the $104^{th}$ and $208^{th}$ segments, respectively. The following equation is used to assign the positions of the training sync signals according to the number of null packets. When the position of the training sync is represented with decimal points from the calculation, the value is raised to the next whole number. Equation 1 shows calculation of the position of the training sync signal in the frame. Here, the position of the training sync signal is one of the 312 segments.

$$\left(\frac{312}{Nn+1}\right) \cdot k \qquad \text{Equation 1}$$

where 'Nn' represents the number of null packets, and 'k' represents the integer (1, 2, 3, . . . , Nn).

For example, when using Equation 1 in the case the number of null packets is 1, the positions of the training sync signals are [(312/3)×1] and [(312/3)×2] so that the training sync signals are positioned on the $104^{th}$ and $208^{th}$ segments.

For another example, when using Equation 1 in the case the number of null packets is 8, the position of the training sync signals is [(312/9)×1]=34.6667. Hence, the first training sync signal is positioned on the $35^{th}$ segment, the second training sync signal is positioned on the (35×2)th segment, the third training sync signal is positioned on the (35×3)th segment, . . . , and the eighth training sync signal is positioned on the (35×8)th segment. Accordingly, in the case the number of null packets is 8, the training sync signals are respectively positioned on the $35^{th}$, $70^{th}$, $104^{th}$, $139^{th}$, $208^{th}$, $243^{rd}$, and $277^{th}$ segments.

When the training sync signals are equally arranged in the field, the transmission of the MPEG TS packets can be fast or slow. In preparation for this case, the null packets corresponding to the respective training sync signals are marked to correspond with the data segment order by using the last 9 bits of the training sync signal. The receiver reads the last 9 bits of the training sync and finds the original position of the null packet so that fast or slow transmission of the MPEG TS can be compensated and the packets can be output to the MPEG TS decoder.

In the preferred embodiment as shown in FIG. 6, the digital TV broadcasting data frames are described as one example, but it is obvious that in the case of inserting the null packet data into the MPEG data and transmitting and receiving information, the null packet data can be exchanged with the training sync signals having a predetermined level and the corresponding MPEG data can be transmitted and received.

For example, when the transmitter and receiver for transmitting the 188-byte MPEG transport packets transmit the information packets and the null packets in different manners, the transmitter converts the null packets into training data of a predetermined pattern known by the receiver and transmits the converted data, and the receiver separates the training data corresponding to the null packets and uses the separated data as the training data for the channel equalizer for a better signal-receiving performance.

Figure 10:
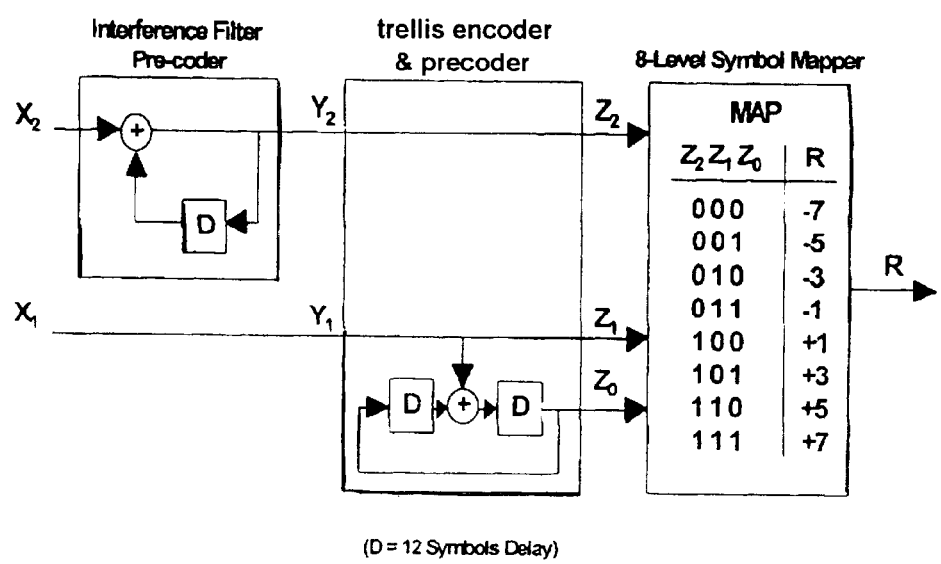
FIG. 10 shows a schematic diagram of the trellis encoder and a pre-coder of FIG. 9.

As shown in FIG. 10, 4-state trellis codes with a code ratio of 2/3 (R=2/3) are used. Signal waves used at the trellis codes have a one-dimensional constellation with 8 levels.

The trellis encoder interleaver performs interleaving on an intra-segment that comprises 12 blocks. Interleaving order is shown in Table 1, and the order is repeated by 3-segment units. Here, the interleaving operation is performed on the data excepting the training sync signal.

TABLE 1

| segment | Block 0 | Block 1 | ... | Block 68 |
|---|---|---|---|---|
| 0 | D0 D1 D2 ... D11 | D0 D1 D2 ... D11 | ... | D0 D1 D2 ... D11 |
| 1 | D4 D5 D6 ... D3 | D4 D5 D6 ... D3 | ... | D4 D5 D6 ... D3 |
| 2 | D8 D9 D10 ... D7 | D8 D9 D10 ... D7 | ... | D8 D9 D10 ... D7 |

Figure 4:
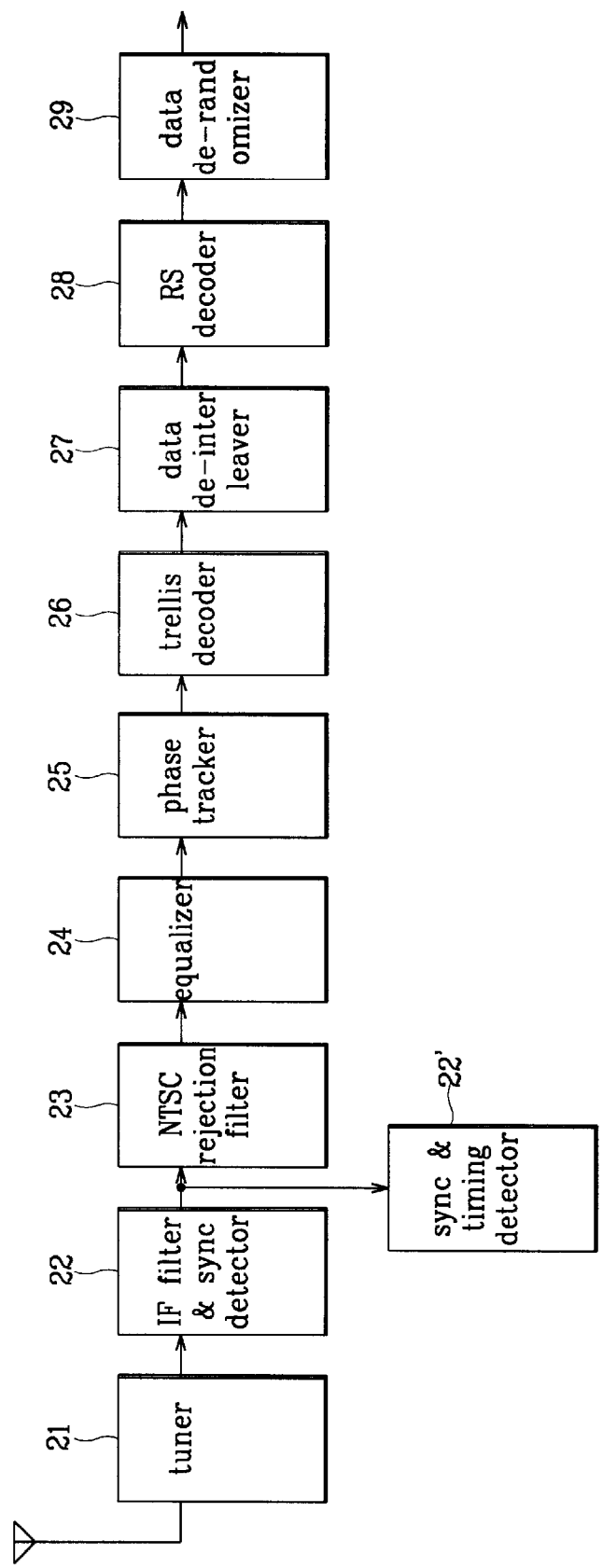
FIG. 4 shows a block diagram of a general receiver of a system for transmitting VSB terrestrial wave broadcasting.
Figure 7:
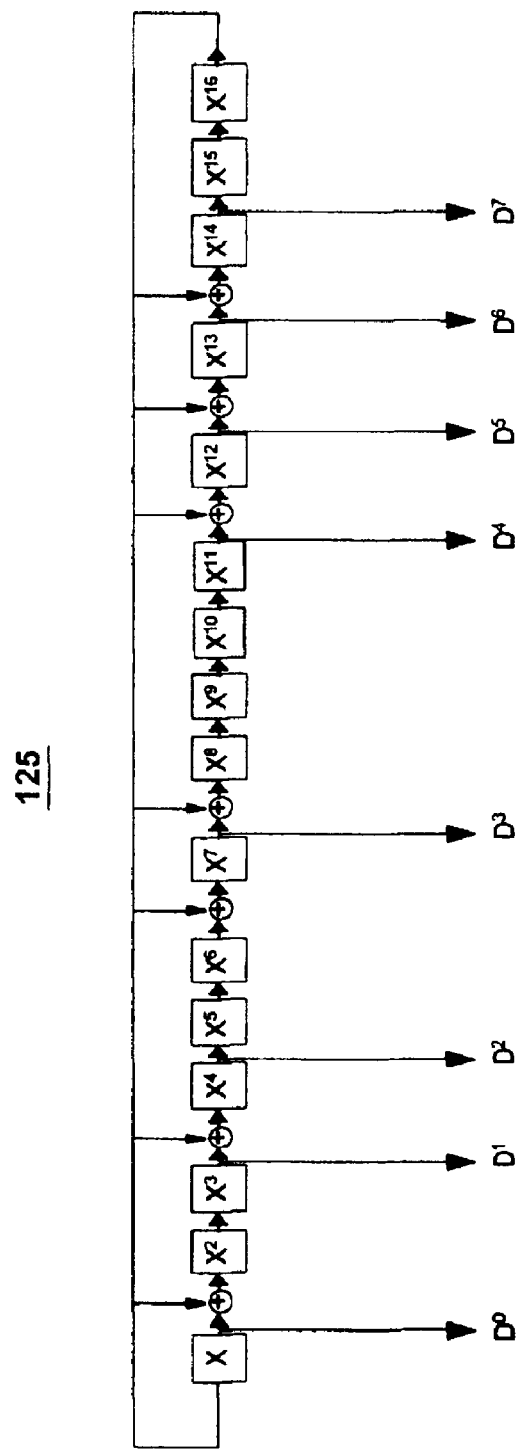
FIG. 7 shows a detailed schematic diagram of a data randomizer of FIG. 4.

FIG. 7 shows a schematic diagram of the data randomizer of FIG. 4.

Referring to FIG. 7, the data randomizer 125 randomizes all the input data except the field sync, the segment sync and the RS additional byte. The data randomizer 125 performs exclusive OR (XOR) operations on all the input data and a pseudo random binary sequence (PRBS) that starts from the starting point of the data field and has a maximum length of 16 bits. The PRBS is generated at a 16-bit shift register having 9 orbital tabs. The 8-bit output of the shift register is provided from the points $X(D^0)$, $X3(D^1)$, $X4(D^2)$, $X7(D^3)$, $X11(D^4)$, $X12(D^5)$, $X13(D^6)$ and $X14(D^7)$ from a following generation polynomial. XOR operations are performed on the data bits as most significant bit (MSB) vs. MSB, and least significant bit (LSB) vs. LSB. The generation polynomial of the randomizer is shown in Equation 2.

When initializing with a hexadecimal F180, the time for initialization occurs in a gap of the data segment sync signal of the first data segment.

$$G_{(16)}=X^{16}+X^{13}+X^{12}+X^{11}+X^7+X^6+X^3+X+1 \quad \text{Equation 2}$$

Output data=(Input data) XOR (Output data bits D[7:0] of the data randomizer)

The randomizer continuously generates the data [7:0] during the period of the training sync, but since the output data are not used in the next block, the data generation is frozen.

Figure 8:
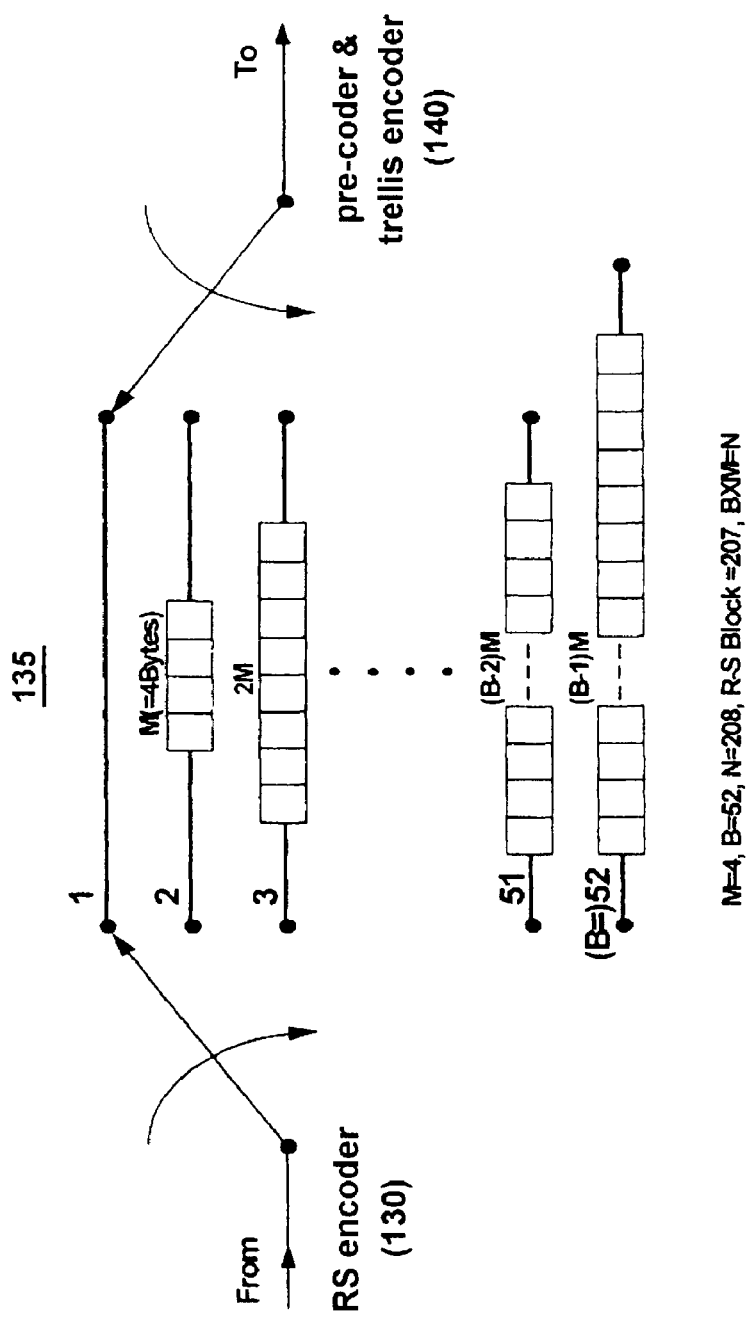
FIG. 8 shows a detailed schematic diagram of a data interleaver of FIG. 5.

FIG. 8 shows a schematic diagram of the data interleaver of FIG. 5.

Referring to FIG. 8, 52 data segment convolution byte interleaving operations are performed on the signals output from the RS encoder 130. Data interleaving is frozen during the period of the training sync since no data is provided to the interleaver. A normal operation is performed at the next segment. That is, a convolution byte interleaving operation is performed on the segments of the data field excepting the training sync signal. Since the interleaving operation is performed on the data bytes and synchronized with the first byte of the data field, the interleaving operation is performed in a field.

Figure 9:
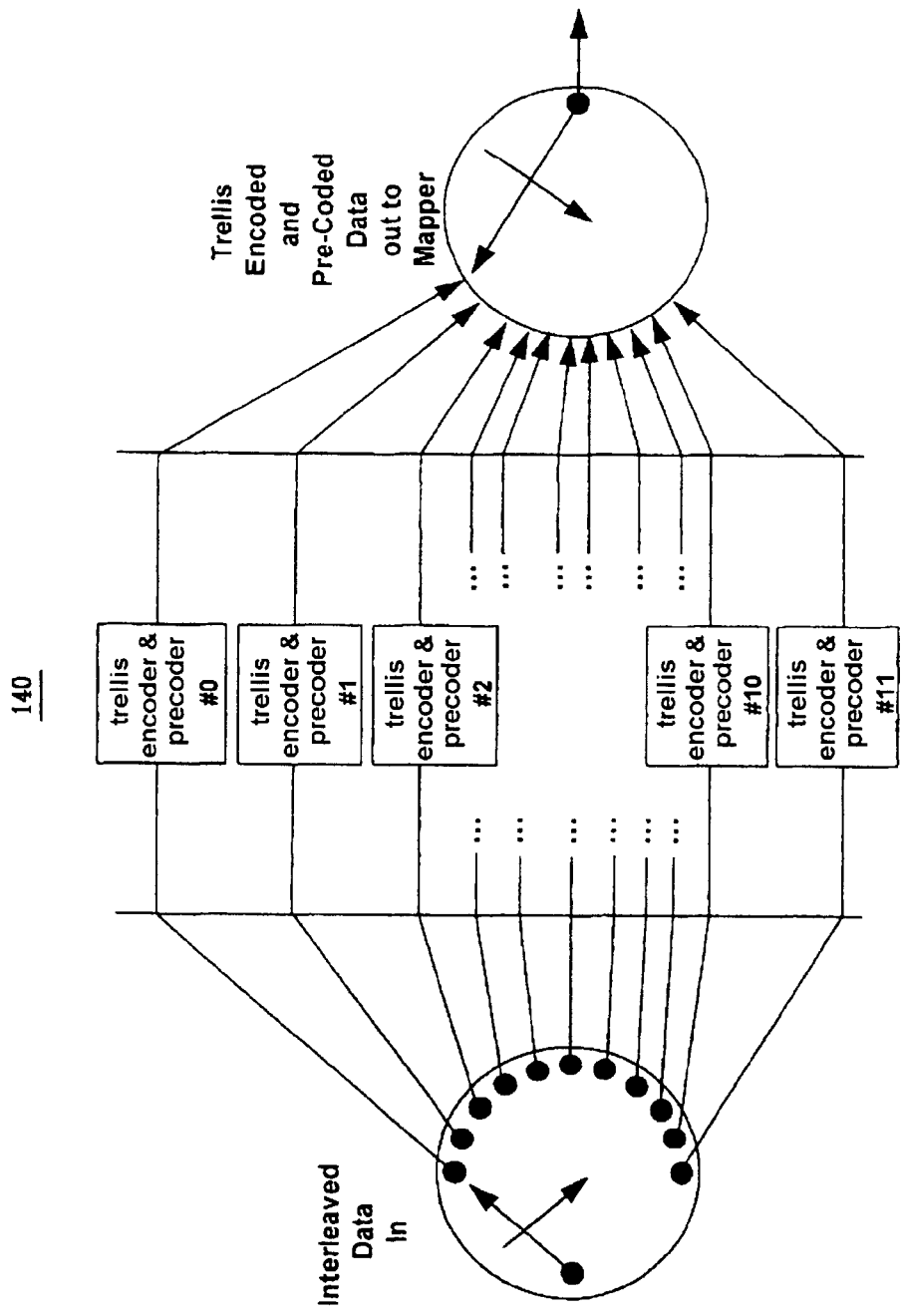
FIG. 9 shows a detailed schematic diagram of a trellis encoder of FIG. 5.

FIG. 9 shows a schematic diagram of a trellis encoder of FIG. 5

Referring to FIG. 9, the trellis encoder that comprises 12 trellis encoder & pre-coders 140 sequentially receives the interleaved data from the data interleaver 135, performs trellis encoding and pre-coding on the data and sequentially outputs the data to a mapper (not illustrated).

FIG. 10 shows a schematic diagram of the trellis encoder and pre-coder of FIG. 9.

Figure 11:
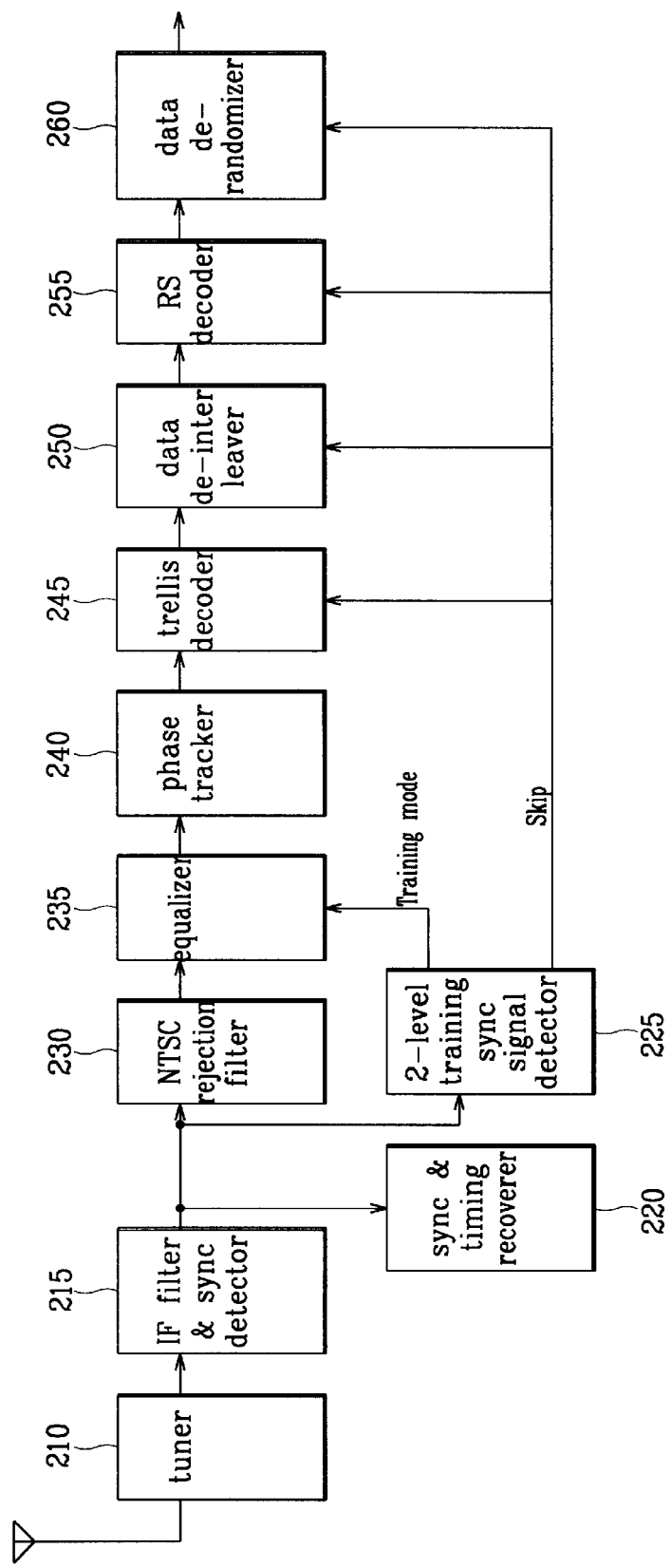
FIG. 11 shows a schematic diagram of a digital TV receiver using the digital TV broadcasting data frames according to the preferred embodiment of the present invention.

FIG. 11 shows a schematic diagram of a digital TV receiver using the digital TV broadcasting data frames according to the preferred embodiment of the present invention.

Referring to FIG. 11, the digital TV receiver using the digital TV broadcasting data frames comprises a tuner 210, an IF filter and sync detector 215, a sync and timing recoverer 220, an NTSC rejection filter 230, a 2-level training sync signal detector 225, an equalizer 235, a phase tracker 240, a trellis decoder 245, a data de-interleaver 250, an RS decoder 255 and a data de-randomizer 260.

The tuner 210 selects one of a plurality of digital TV broadcasting channels input via an antenna and outputs the selected channel, and the IF filter 215 filters the intermediate bands while the sync detector 215 detects desired frequencies. The sync and timing recoverer 220 detects the sync signals and clock signals, and these signals pass through the NTSC rejection filter 230, and the equalizer 235 removes interferences caused by the multi-path signals.

The sync and timing recoverer 220 recovers the segment sync signals, field sync signals and symbol timings from the broadcasting data frames input via the tuner 210 and the IF filter and sync detector 215.

The 2-level training sync signal detector 225 outputs skip pulses corresponding to the training mode signals and the training sync signals when the 2-level training sync signal is detected from the broadcasting data frames.

The NTSC rejection filter 230 removes the NTSC interference signals from the broadcasting data frames and outputs the results to the equalizer 235.

The equalizer 235 compensates for channel distortions generated during data transmission, and when the training mode signal is input, uses the training sync signal as training data and converges the same.

The phase tracker 240 compensates and recovers the phase errors of the data output from the equalizer 235, and outputs the results to the trellis decoder 245.

The trellis decoder 245 decodes the phase-tracked data and outputs the results to the data de-interleaver 250, and when the skip pulses are input from the 2-level training sync signal detector 225, freezes the decoding operation.

The data de-interleaver 250 de-interleaves the decoded data and outputs the results to the RS decoder 225, and when the skip pulses are input from the 2-level training sync signal detector 225, freezes the de-interleaving operation.

The RS decoder 225 decodes the de-interleaved data and outputs the results to the data de-randomizer 260, and when the skip pulses are input from the 2-level training sync signal detector 225, freezes the decoding operation.

The data de-randomizer 260 performs de-randomization on the decoded data and outputs the results, and when the skip pulses are input from the 2-level training sync signal detector 225, freezes the de-randomization operation.

The equalizer 235 uses the training sync signals provided by the 2-level training sync signal detector 225 as the training data, and the 2-level training sync signal detector 225 generates the skip pulses corresponding to the training sync signals, and when the skip state is ON, freezes the trellis decoder 245, the data de-interleaver 250, the RS decoder 255 and the data de-randomizer 260.

To detect the positions of the training sync signals, the 2-level training sync signal detector 225 is used, or 9 bits of the 104 symbols in the preliminary space of the training sync signals are used.

When the positions of the training sync signals are detected using these methods, the data decoding process is performed in the reverse order to that of the transmitter.

The data decoding is performed in the order of the trellis decoder 245, the data de-interleaver 250, the RS decoder 255 and the data de-randomizer 260. The decoding method is identical with that performed by the transmitter. That is, the training sync part is skipped.

The 8 levels include ±a, ±3a, ±5a and ±7a levels (where, the letter 'a' is a constant.), and the 2-level training sync signal detector 225 has the ±5a levels.

Since the transmission rate of the +a or the −a is 1/4 in the case of the 8-level, the number of symbols below the ±2a is searched in a single segment, and when the number is below a reference value, it is determined to be a 2-level signal, and when the number is over the reference value, it is determined to be a 8-level signal. Here, it is adequate for the reference value to be 1/8 to 1/6 of the number of the 2-level symbols in the single segment.

As described above, the null packets having no relation with the broadcasting signals are exchanged for the training data and then used in equalization at the receiver, and therefore the receiving performance of the multi-path signals in the moving or still environments when receiving the digital TV broadcasting can be improved.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. In a digital television broadcasting transmitting and receiving method using a data frame including at least one data field having 313 data segments, the first data segment of the data field being a data field sync signal including a training data sequence used in equalization by a receiver, and each of the remaining 312 data segments including a 188-byte transport packet and 20-byte error correction data, a digital television broadcasting transmitting and receiving method using a moving picture experts group (MPEG) data frame comprising:

segments, corresponding to null packets from the 312 data segments, including a training sync signal that is a predetermined data pattern with a predetermined level, the training sync signal being used as training data of an equalizer at a receiver so as to increase receiving performance at the receiver whether it moves or is stationary.

2. The method of claim 1, wherein positions of the training sync signal are linked with generation of the null packets.

3. The method of claim 1, wherein positions of the training sync signal are equally provided in the data field according to a number of null packets.

4. The method of claim 3, wherein the positions of the training sync signal are calculated using $$\left(\frac{312}{Nn+1}\right) \cdot k,$$

where, 'Nn' represents the number of null packets, and 'k' represents the integer (1, 2, 3, . . . , Nn).

5. The method of claim 1, wherein the training sync signal with a predetermined level is a 2-level training sync signal.

6. In a digital television transmitter including a moving picture experts group 2 (MPEG-2) transport encoder that outputs serial data configured in a MPEG-2 transport stream configuration having 188-byte packets, and a data format buffer that temporarily stores the serial data and outputs formatted data, a digital television transmitter comprising:

a null packet detector for checking whether the formatted data include null packets, and when the formatted data include the null packets, outputting skip pulses and training sync signals;

an encoder for encoding the formatted data and outputting the encoded data, and when the skip pulses are input, freezing the encoding operation; and a multiplexer for receiving segment sync signals and data field sync signals, receiving the training sync signals from the null packet detector, multiplexing the encoded data provided by the encoder, and outputting digital television broadcasting data frames.

7. The transmitter of claim 6, wherein the encoder comprises:

a data randomizer for randomizing the data provided by the data format buffer and outputting the randomized data, and when the skip pulses are input, freezing the randomizing operation;

a Reed-Solomon (RS) encoder for performing RS encoding on the data output from the data randomizer and outputting the RS-encoded data, and when the skip pulses are input, freezing the RS encoding operation;

a data interleaver for interleaving the RS-encoded data and outputting the interleaved data, and when the skip pulses are input, freezing the interleaving operation; and a trellis encoder for performing trellis encoding on the interleaved data and outputting the trellis-encoded data to the multiplexer, and when the skip pulses are input, freezing the trellis encoding operation.

8. The transmitter of claim 6, wherein the digital television broadcasting data frame comprises:

a data frame including at least one data field having 313 data segments, the first data segment of the data field being a data field sync signal including a training data sequence used in equalization by a receiver, and the remaining 312 data segments each including a 188-byte transport packet and 20-byte error correction data; and segments, corresponding to null packets from the 312 data segments, including a training sync signal that is a predetermined data pattern with a predetermined level.

9. The transmitter of claim 8, wherein positions of the training sync signal are linked with generation of the null packets.

10. The method transmitter of claim 8, wherein positions of the training sync signal are equally provided in the data field according to the number of null packets.

11. The transmitter of claim 10, wherein the positions of the training sync signal are calculated using $$\left(\frac{312}{Nn+1}\right) \cdot k,$$

where 'Nn' represents the number of null packets, and 'k' represents the integer (1, 2, 3, . . . , Nn).

12. In a digital television receiver including a tuner, an intermediate frequency (IF) filter and sync detector, a sync and timing recoverer that recovers segment sync signals, field sync signals and symbol timing from digital television broadcasting data frames provided via the tuner and the IF filter and sync detector, and a national television standards committee (NTSC) rejection filter that rejects NTSC interference signals from the digital television broadcasting data frames, a digital television receiver comprising:

a 2-level training sync signal detector for outputting training mode signals and skip pulses corresponding to training sync signals when the 2-level training sync signal is detected from the digital television broadcasting data frames;

an equalizer for compensating for channel distortions generated during the data transmission, and when the training mode signal is input, using the training sync signal as the training data and converging the same;

a phase tracker for recovering phases of the data output from the equalizer; and a decoder for decoding the phase-recovered data and outputting digital television receiving data, and when skip pulses are input, freezing the decoding operation.

13. The receiver of claim 12, wherein the decoder comprises:

a trellis decoder for performing trellis decoding on the phase-tracked data, and when the skip pulses are input, freezing the trellis decoding operation;

a data de-interleaver for de interleaving the trellis-decoded data, and when the skip pulses are input, freezing the de-interleaving operation;

a Reed-Solomon (RS) decoder for performing RS decoding on the de-interleaved data, and when the skip pulses are input, freezing the RS decoding operation; and a data de-randomizer for performing de-randomization on the RS decoded data, and when the skip pulses are input, freezing the de-randomization operation.

14. The receiver of claim 12, wherein the digital television broadcasting data frame comprises:

a data frame including at least one data field having 313 data segments, the first data segment of the data field being a data field sync signal including a training data sequence used in equalization by a receiver, and the remaining 312 data segments each including a 188-byte transport packet and 20-byte error correction data; and segments, corresponding to null packets from the 312 data segments, including a training sync signal that is a predetermined data pattern with a predetermined level.

15. The receiver of claim 14, wherein positions of the training sync signal are linked with generation of the null packets.

16. The receiver of claim 14, wherein positions of the training sync signal are equally provided in the data field according to the number of null packets.

17. The receiver of claim 16, wherein the positions of the training sync signal are calculated using $$\left(\frac{312}{Nn+1}\right) \cdot k,$$

where "Nn" represents the number of null packets, and 'k' represents the integer (1, 2, 3, . . . , Nn).

18. A moving picture experts group (MPEG) data transmitting and receiving system, comprising:

an MPEG data transmitter for converting packets that have no information into training data having a predetermined pattern that can be read by a receiver, and transmitting 188-byte MPEG transport packets including at least one of the converted training data packets and information packets; and an MPEG data receiver, including an equalizer, for separating the training data packets from the transmitted MPEG transport packets, and using the training data packets as training data for correcting degradations generated by a transmission channel so as to enhance receiving performance.

19. A data frame having a data field of segments, the data frame comprising:

one or more segments corresponding to null packets in an input serial data having a moving picture experts group (MPEG) structure, each segment including a training sync signal that is a predetermined data pattern with a predetermined level.

20. The data frame of claim 19, wherein each segment including a training sync signal has a position in the data field corresponding to a null packet.

21. The data frame of claim 19, wherein each segment including a training sync signal has a position in the data field based upon a number of null packets in the input serial data.

22. The data frame of claim 21, wherein the positions are equally provided in the data field.

23. The data frame of claim 21, wherein the positions are calculated using $$\left(\frac{312}{Nn+1}\right) \cdot k,$$

where, 'Nn' represents the number of null packets, and 'k' represents the integer (1, 2, 3, . . . , Nn).

24. The data frame of claim 19, wherein each training sync signal is a 2-level training sync signal.

25. The data frame of claim 19, further comprising:

one or more segments including a data field sync signal, the data field sync signal having a training data sequence used in equalization by a receiver.

26. The data frame of claim 19, further comprising:

one or more data segments, each data segment including a segment sync signal, a transport packet, and an error correction data.

* * * * *